United States Patent
Maeda (12)

(10) Patent No.: US 9,641,961 B2
(45) Date of Patent: May 2, 2017

(54) SYSTEM, SYSTEM CONTROL METHOD, INFORMATION PROCESSING APPARATUS, AND STORAGE MEDIUM

(71) Applicant: CANON KABUSHIKI KAISHA, Tokyo (JP)

(72) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/815,689

(22) Filed: Jul. 31, 2015

(65) Prior Publication Data

US 2016/0043779 A1    Feb. 11, 2016

(30) Foreign Application Priority Data

Aug. 5, 2014    (JP) .................... 2014-159369

(51) Int. Cl.
*H04W 4/00* (2009.01)
*H04B 5/00* (2006.01)

(52) U.S. Cl.
CPC .......... *H04W 4/008* (2013.01); *H04B 5/0056* (2013.01); *H04B 5/0062* (2013.01)

(58) Field of Classification Search
CPC ..... H04W 4/008; H04W 60/04; H04W 4/025; H04W 36/005; H04W 36/14; H04W 36/003; H04W 4/16; H04W 12/06; H04B 7/26; H04B 5/0056; H04B 5/0062; H04L 69/08; E05B 39/00; G06K 19/073; G06K 19/07773; G06K 7/10316; G06K 7/10158

USPC ......... 340/5.32, 10.34, 10.51; 455/41.1, 41.2
See application file for complete search history.

(56) References Cited

U.S. PATENT DOCUMENTS

| | | | |
|---|---|---|---|
| 9,002,266 B2* | 4/2015 | Song | H04B 7/26 455/41.1 |
| 2015/0099502 A1* | 4/2015 | Park | H04W 4/16 455/418 |
| 2015/0215435 A1* | 7/2015 | Hillan | H04L 69/08 455/41.1 |
| 2015/0281876 A1* | 10/2015 | Kurihara | H04W 4/008 455/41.1 |
| 2016/0188925 A1* | 6/2016 | Liu | G06K 19/073 340/10.34 |

FOREIGN PATENT DOCUMENTS

JP    2013-045462 A    3/2013

* cited by examiner

*Primary Examiner* — Ali Neyzari
(74) *Attorney, Agent, or Firm* — Canon U.S.A., Inc. IP Division

(57) ABSTRACT

A system includes a mobile terminal apparatus and an electronic apparatus perform near-field communication, where the mobile terminal apparatus obtains information from a near-field communication tag chip installed in the electronic apparatus. The mobile terminal apparatus reads first information from the tag chip and writes, in the tag chip, second information representing a request for replacement of information stored in the tag chip.

16 Claims, 17 Drawing Sheets

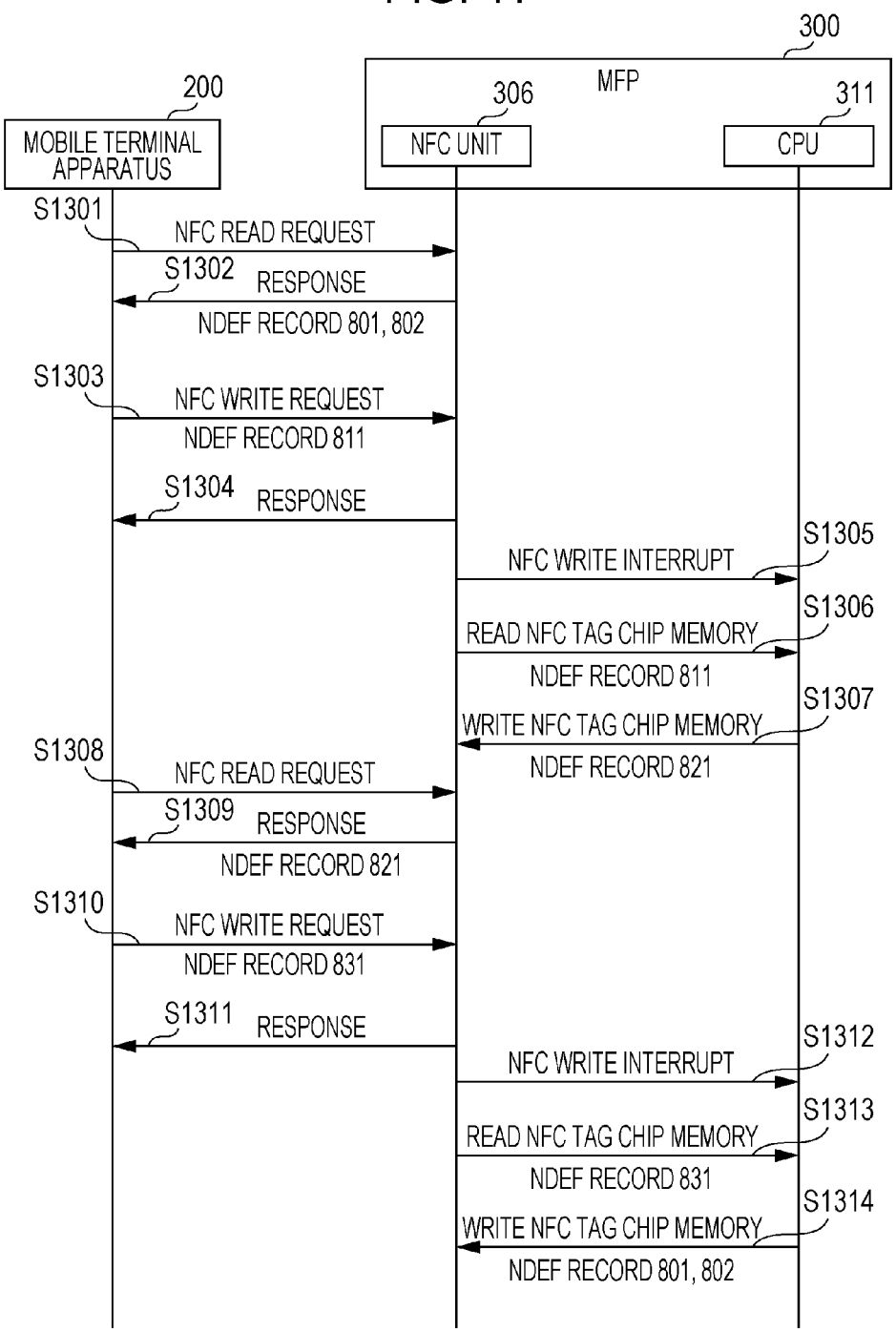

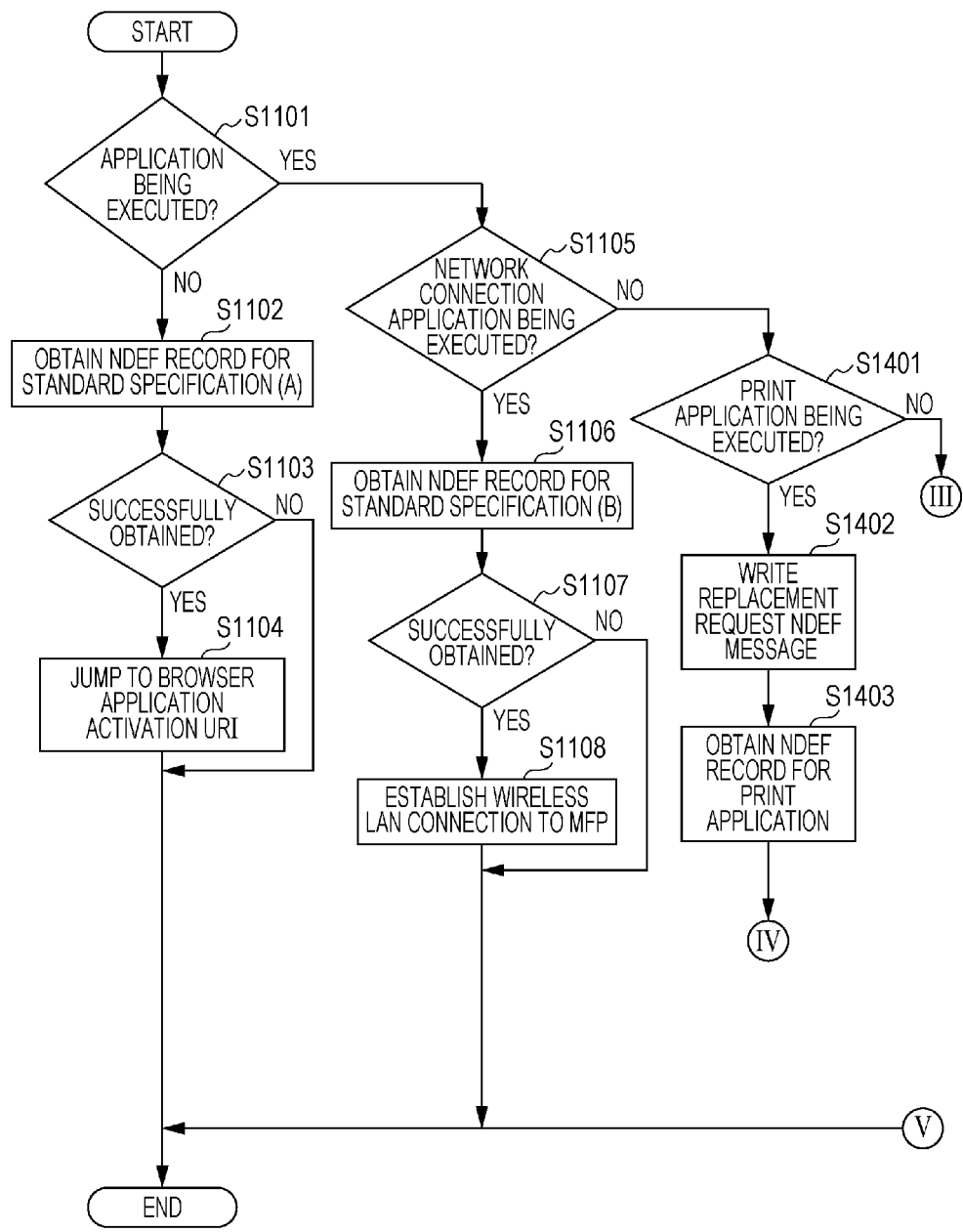

SYSTEM, SYSTEM CONTROL METHOD, INFORMATION PROCESSING APPARATUS, AND STORAGE MEDIUM

BACKGROUND

Field

Aspects of the present disclosure generally relate to a method, employed in a mobile terminal apparatus, for obtaining information from an NFC tag chip installed in an electronic apparatus through NFC communication between the mobile terminal apparatus and the electronic apparatus.

Description of the Related Art

In recent years, mobile terminal apparatuses and various electronic apparatuses incorporating a near-field communication unit based on a near-field communication (NFC) standard or the like have been widely used. In the NFC, an NFC data exchange format (NDEF) is used as a basic format of information transmitted and received between NFC elements in addition to a hardware communication method between the NFC elements.

By this, highly-compatible information communication may be executed between apparatuses compatible with the NFC. Information may be transmitted and received between mobile terminal apparatuses and various electronic apparatuses by touching NFC antenna units of the electronic apparatuses by the NFC antenna units of the mobile terminal apparatuses. In this way, desired operations may be executed with ease. For example, an application for an electronic apparatus is downloaded from a server to a mobile terminal apparatus when an NFC antenna unit of the electronic apparatus is touched by an NFC antenna unit of the mobile terminal apparatus.

Japanese Patent Laid-Open No. 2013-45462 discloses, for example, a technique of searching information read from an NFC tag for an appropriate application and installing or executing the application.

A plurality of standard specifications are defined in accordance with environments and purposes of use of OSs, applications, and the like. However, one electronic apparatus is preferably compatible with a plurality of standard specifications in some cases. In a case of a multifunction peripheral including a printer and a scanner, for example, different specifications are employed for use of the printer and use of the scanner in some cases. Furthermore, when an NFC touch is performed while a standard application for printing an image is operated in a mobile terminal apparatus, an operation based on a specific specification for printing is desired to be performed in some cases. Moreover, when an NFC touch is performed while a standard application for inputting an image is operated in a mobile terminal apparatus, an operation based on a specific specification for use of a scanner is desired to be performed in some cases. Furthermore, even in a case where the same operations for printing are to be performed, different specifications are desired to be used depending on types of OS operated in a mobile terminal apparatus in some cases. Furthermore, in addition to the standard specification, a specification unique to an electronic apparatus manufacturer may be defined and unique information may be assigned to applications supplied by the electronic apparatus manufacturer.

If all these plurality of specifications are defined as specifications based on the NDEF, and in addition, if NDEF data including an NDEF record which is compatible with the plurality of specifications is allowed to be written in a tag chip of an NFC unit of the MFP, the plurality of specifications may be realized.

However, a capacity of the NFC unit generally has limitation, and therefore, data on the plurality of specifications described above may not be written in the tag chip. In Japanese Patent Laid-Open No. 2013-45462, a case where required data may not be written in a nonvolatile memory capacity of the NFC unit is not taken into consideration.

SUMMARY

The present disclosure provides appropriate data without increasing a capacity of a tag chip included in an NFC unit.

A system of the present disclosure includes a mobile terminal apparatus and an electronic apparatus that communicate using near-field communication. The mobile terminal apparatus includes a read unit configured to read first information from a near field communication tag chip of the electronic apparatus and a first write unit configured to write, in the tag chip, second information representing a request for replacement of information stored in the tag chip. The electronic apparatus includes a second write unit configured to write third information in the tag chip after the second information is written in the tag chip by the mobile terminal apparatus. The read unit reads the third information from the tag chip of the electronic apparatus, while the second write unit writes back the first information in the tag chip after the third information is read from the tag chip.

Further features of the present disclosure will become apparent from the following description of exemplary embodiments with reference to the attached drawings.

BRIEF DESCRIPTION OF THE DRAWINGS

FIG. 11 is a sequence diagram of information obtainment according to this embodiment.

FIGS. 13A and 13B are a flowchart illustrating a process executed by a CPU of a mobile terminal apparatus.

DESCRIPTION OF THE EMBODIMENTS

Hereinafter, embodiments of the present disclosure will be described in detail. Note that components described in the embodiments represent forms of the present disclosure as examples, and the scope of the present disclosure is not limited to them.

First Embodiment

Figure 1:
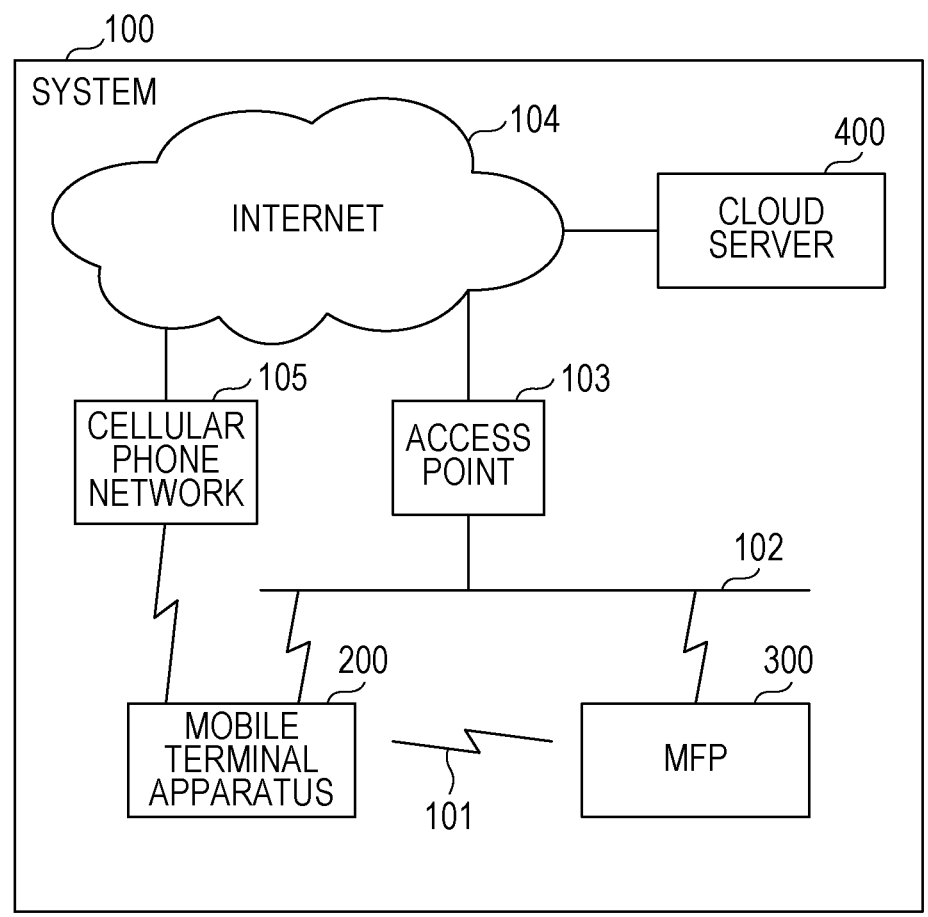
FIG. 1 is a diagram illustrating a configuration of a system according to a first embodiment of the present disclosure.

FIG. 1 is a diagram illustrating a configuration of a system 100 according to a first embodiment of the present disclosure.

In the system 100, a mobile terminal apparatus 200 and an MFP 300 may communicate with each other by proximity wireless communication 101, such as near-field communication (NFC). Furthermore, the mobile terminal apparatus 200 and the MFP 300 are connectable by using a wireless LAN 102, directly to each other or through an access point 103. The access point 103 has a router function and is connected to the Internet 104 externally provided. The mobile terminal apparatus 200 and the MFP 300 may communicate with a cloud server 400 connected to the Internet 104. Furthermore, the mobile terminal apparatus 200 is also connected to a cellular phone network 105 provided separately from the wireless LAN 102, and may also be connected to the cloud server 400 through the cellular phone network 105. The mobile terminal apparatus 200 is simply referred to as an "information processing apparatus" where appropriate.

The system 100 may have a configuration different from that illustrated in FIG. 1, even also in this case, the effects of the disclosure are obtained. Although the access point 103 has the router function, a router device may be configured by a device different from the access point 103, for example.

Furthermore, although the mobile terminal apparatus 200 may be connected to the Internet 104 through the access point 103 using the wireless LAN 102, the mobile terminal apparatus 200 may communicate only with the MFP 300. In this case, the mobile terminal apparatus 200 is capable of communicating with the Internet 104 and the cloud server 400 only through the cellular phone network 105. Furthermore, as an application example of the first embodiment, it is not necessarily the case that all the components described herein are included in the system 100. The first embodiment is applicable as long as the NFC communication is performed between the mobile terminal apparatus 200 and the MFP 300.

Figure 2:
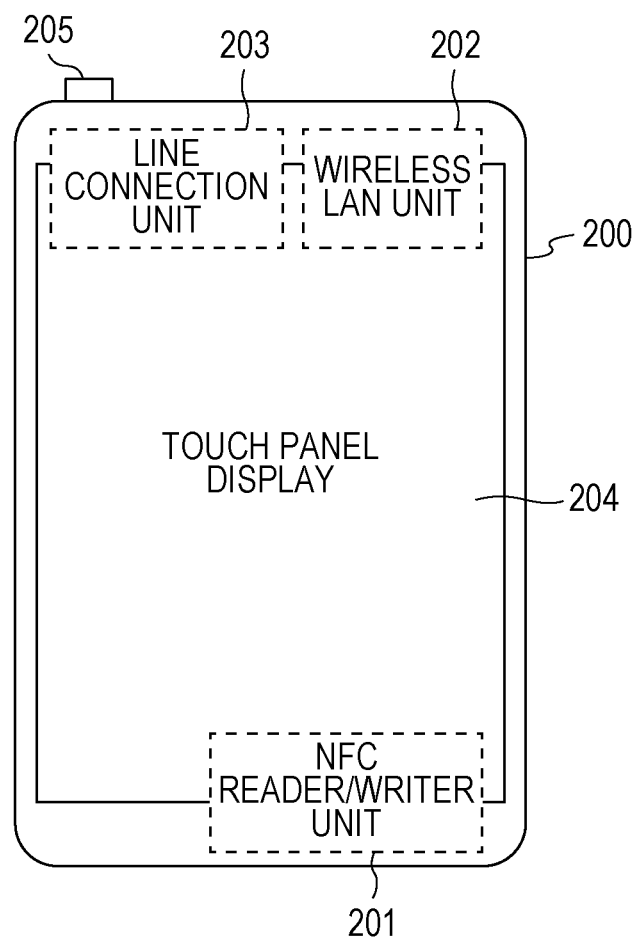
FIG. 2 is a diagram illustrating an appearance of a mobile terminal apparatus.

FIG. 2 is a diagram illustrating an appearance of the mobile terminal apparatus 200. A smartphone is employed as an example in this embodiment. Smartphones are multi-function cellular phones having a camera function, a net browser function, a mail function, and the like in addition to a cellular phone function. An NFC reader/writer unit 201 performs proximity wireless communication using the NFC. When the NFC reader/writer unit 201 is moved close to a range within approximately 10 cm from an NFC unit of a communication counterpart, the NFC reader/writer unit 201 may read content of a tag chip memory of the NFC unit of the communication counterpart and perform writing on the tag chip memory of the NFC unit of the communication counterpart.

A wireless LAN unit 202 performs communication through the wireless LAN 102 and is included in the mobile terminal apparatus 200. A mobile communication unit 203 performs communication through the cellular phone network 105 and is included in the mobile terminal apparatus 200. A touch panel display 204 has a display mechanism employing an LCD method and an operation mechanism employing a touch panel method and is disposed on a front surface of the mobile terminal apparatus 200. As a representative operation method, operation parts of a button form are displayed on the touch panel display 204, and a user performs a touch operation on the touch panel display 204 so that an event corresponding to a pressed button is issued. A power source key 205 is used to turn on or off the mobile terminal apparatus 200.

Figure 3A:
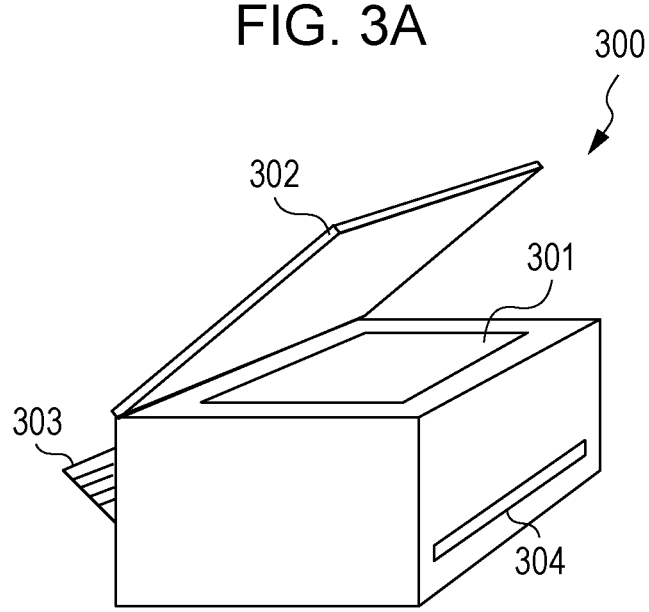
FIGS. 3A and 3B are diagrams illustrating an appearance of an MFP.
Figure 3B:
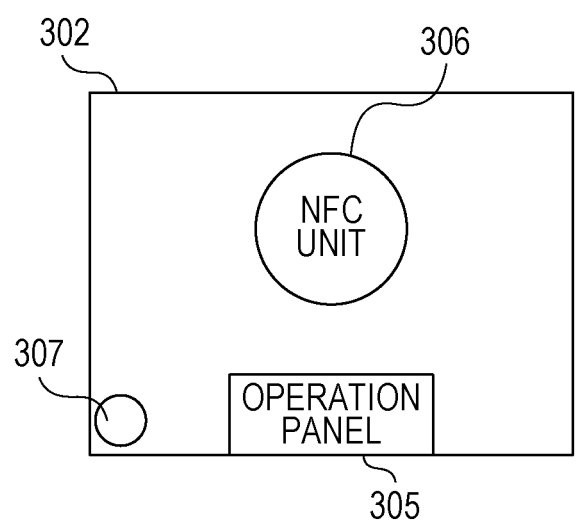

FIGS. 3A and 3B are diagrams illustrating an appearance of the MFP 300.

The MFP 300 according to the first embodiment has a print function, a scanner function, and the like. The MFP 300 may function as only a print apparatus or a scanner apparatus.

FIG. 3A is a diagram illustrating an entire appearance of the MFP 300. A platen glass 301 is a transparent table formed by glass and is used for placing an original so that the original is read by a scanner. A platen glass pressing plate 302 presses the original against the platen glass 301 so that the original does not float when the original is read by the scanner and serves as a cover so that external light does not enter a scanner unit. Different sizes of sheets may be set to a print sheet insertion opening 303. A sheet set in the print sheet insertion opening 303 is conveyed to a print unit one by one, subjected to a desired print process, and discharged from a print sheet ejection opening 304.

FIG. 3B is a diagram illustrating the appearance of the MFP 300 viewed from an upper surface of the MFP 300. An operation panel 305 and an NFC unit 306 are disposed on an upper portion in the platen glass pressing plate 302. The NFC unit 306 performs the proximity wireless communication. The communication may be performed when an NFC unit of a communication counterpart is moved close to a range within approximately 10 cm of the NFC unit 306 of the print apparatus. A wireless LAN antenna 307 is embedded which performs communication through the wireless LAN 102.

Figure 4:
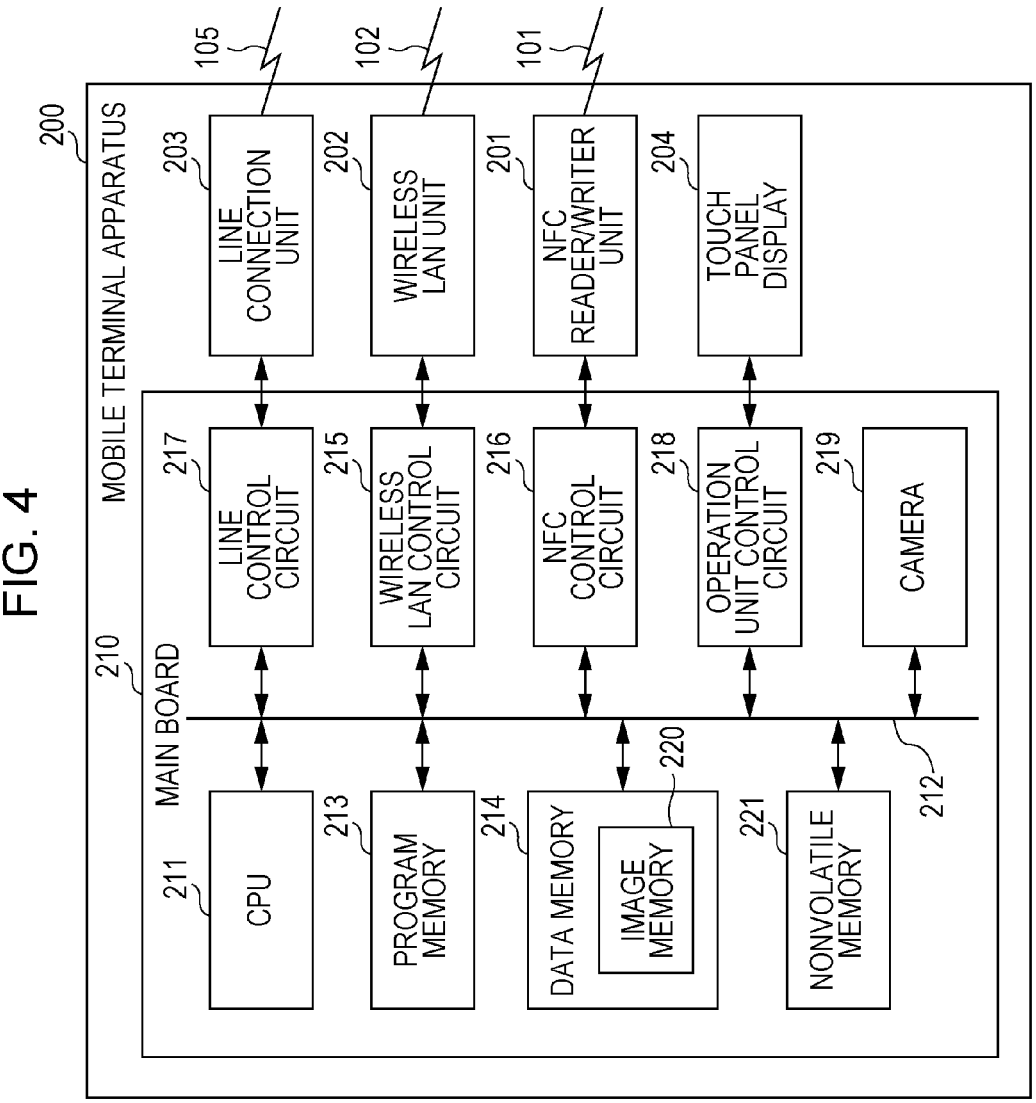
FIG. 4 is a block diagram illustrating a configuration of the mobile terminal apparatus.

FIG. 4 is a block diagram illustrating a configuration of the mobile terminal apparatus 200.

The mobile terminal apparatus 200 includes a main board 210 which controls the entire apparatus, the wireless LAN unit 202, the NFC reader/writer unit 201, and the mobile communication unit 203. A CPU 211 which is a microprocessor is disposed on the main board 210 and operates in accordance with a control program stored in a program memory 213 which is a ROM connected through an internal bus 212 and content of a data memory 214 which is a RAM.

The CPU 211 controls the wireless LAN unit 202 through the wireless LAN control circuit 215 so as to perform wireless LAN communication with other communication terminal apparatuses. The CPU 211 controls the NFC reader/writer unit 201 through an NFC control circuit 216 so as to detect connection to another NFC terminal and transmit data to and receive data from the other NFC terminal. Furthermore, the CPU 211 controls the mobile communication unit 203 through a mobile communication control circuit 217 so as to be connected to the cellular phone network 105 and perform telephone call and data transmission/reception. The CPU 211 controls an operation unit control circuit 218 so as to perform desired display on the touch panel display 204 and accept user's operations. The CPU 211 controls a camera unit 219 so as to capture an image and stores the captured image in an image memory 220 included in the data memory 214. Furthermore, the CPU 211 stores, in addition to captured images, images externally obtained through the cellular phone network 105, the wireless LAN 102, and the NFC 101 in the image memory 220, and conversely transmits such images to the outside.

A nonvolatile memory 221 is a flash memory, for example, and stores data to be maintained even after power is off. For example, the nonvolatile memory 221 stores, in addition to telephone book data, various communication connection information, and information on devices previously connected, image data to be maintained, application software which realizes various functions in the mobile terminal apparatus 200, and the like.

Figure 5:
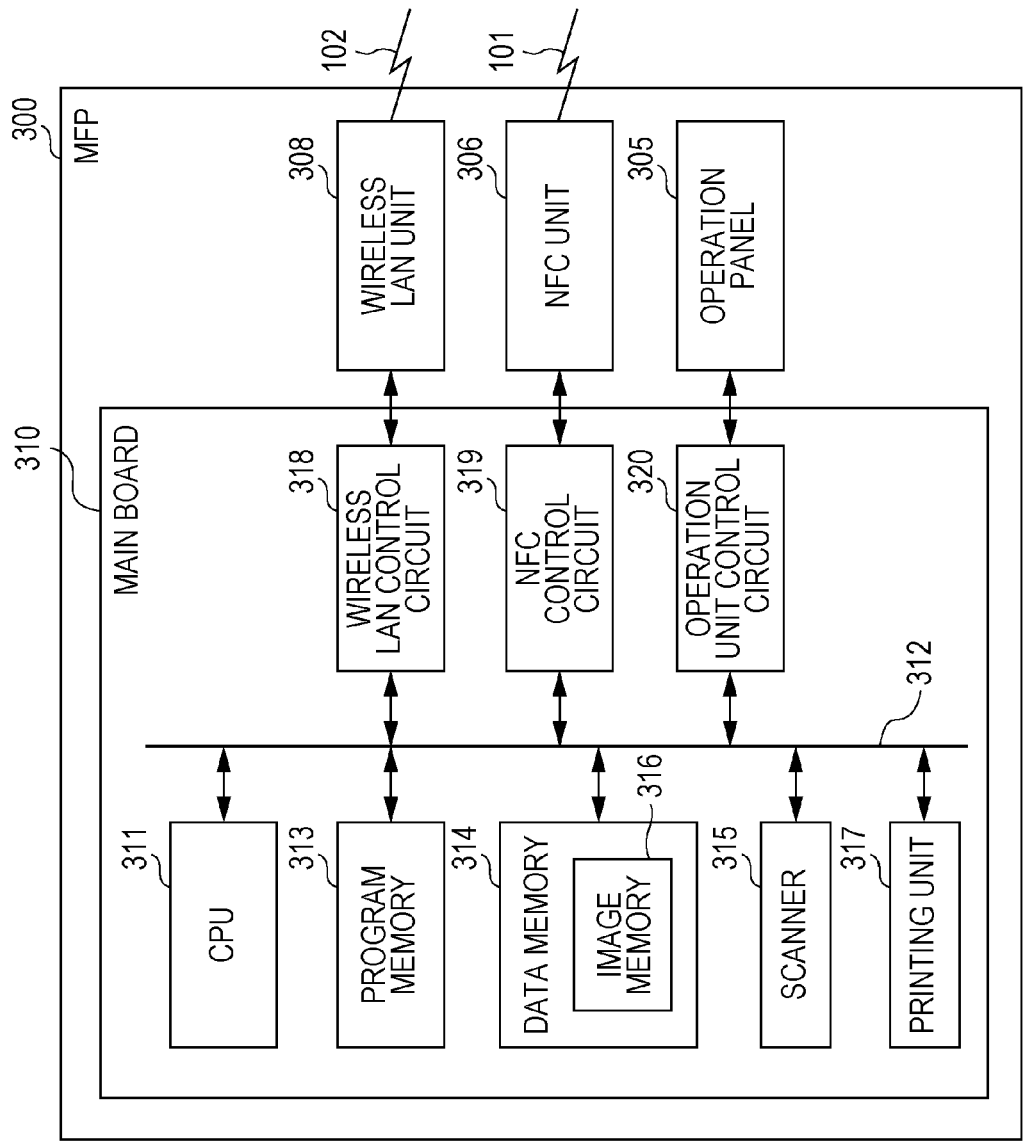
FIG. 5 is a block diagram illustrating a configuration of the MFP.

FIG. 5 is a block diagram illustrating a configuration of the MFP 300.

The MFP 300 includes a main board 310 which controls the entire apparatus, a wireless LAN unit 308, and the NFC unit 306. A CPU 311 which is a microprocessor is disposed on the main board 310 and operates in accordance with a control program stored in a program memory 313 which is a ROM connected through an internal bus 312 and content of a data memory 314 which is a RAM.

The CPU 311 controls a scanner unit 315 so as to read an original and stores the read original in an image memory 316 included in the data memory 314. Furthermore, the CPU 311 controls a print unit 317 so as to print an image included in the image memory 316 of the data memory 314 on a recording medium. The CPU 311 controls the wireless LAN unit 308 through a wireless LAN control circuit 318 so as to perform wireless LAN communication with other communication terminal apparatuses. Furthermore, the CPU 311 controls the NFC unit 306 through an NFC control circuit 319 so as to detect connection to another NFC terminal and transmit data to and receive data from the other NFC terminal. The CPU 311 controls an operation unit control circuit 320 so as to display a state of the print apparatus and a function selection menu on the operation panel 305 and accepts user's operations.

Figure 6:
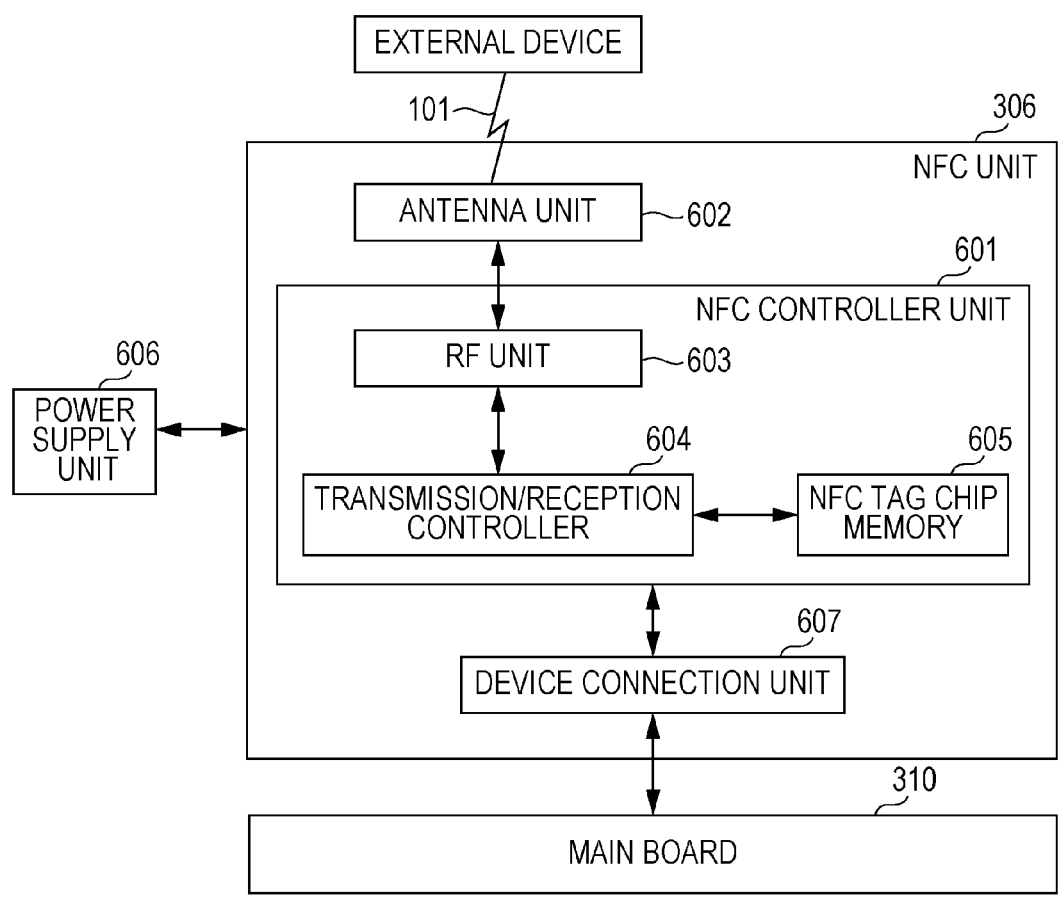
FIG. 6 is a block diagram illustrating a configuration of an NFC unit included in the MFP.

FIG. 6 is a block diagram illustrating a configuration of the NFC unit 306 included in the MFP 300.

In a case where the near-field communication is performed by the NFC, an apparatus which outputs a radio frequency (RF) field at the beginning so as to start communication is referred to as an "initiator". Furthermore, an apparatus which communicates with the initiator in response to an instruction issued by the initiator is referred to as a "target".

Here, a passive mode and an active mode will be described. Communication modes of the NFC unit 306 include a passive mode and an active mode.

In the passive mode, the target performs response to an instruction issued by the initiator by performing load modulation. Therefore, power supply is not required for the target. On the other hand, in the active mode, the target performs response to an instruction issued by the initiator by an RF field generated by the target. Therefore, power supply is required for the target. A communication speed in the active mode is higher than that of the passive mode.

In this embodiment, the mobile terminal apparatus 200 functions as the initiator and the MFP 300 functions as the target. The NFC reader/writer unit 201 of the mobile terminal apparatus 200 performs reading and writing on the NFC unit 306 of the MFP 300.

The NFC unit 306 includes an NFC controller unit 601, an antenna unit 602, an RF unit 603, a transmission/reception controller 604, an NFC tag chip memory 605, and a device connection unit 607. The antenna unit 602 receives electric waves and carriers from other NFC devices and transmits electric waves and carriers to the other NFC devices. The RF unit 603 has a function of modulating an analog signal into a digital signal and demodulating a digital signal into an analog signal. The RF unit 603 including a synthesizer identifies frequencies of bands and channels and controls the bands and the channels using frequency assigning data.

The NFC tag chip memory 605 is a nonvolatile memory, and stored data may be read from the NFC tag chip memory 605 and data may be written to the NFC tag chip memory 605 even when power is not supplied from a power supply unit 606 of the MFP 300. Specifically, data stored in the NFC tag chip memory 605 may be read by an external device and data may be written in the NFC tag chip memory 605 by the external device through communication in the passive mode of the NFC. Data storage control including reading of data from and writing of data to the NFC tag chip memory 605 is realized by the NFC controller unit 601. Since the NFC tag chip memory 605 is the nonvolatile memory as described above, a capacity of the NFC tag chip memory 605 is limited in terms of product cost. Information generated in accordance with a specification of NDEF described below is stored in the NFC tag chip memory 605, and only an amount of data within the capacity of the NFC tag chip memory 605 may be stored.

The transmission/reception controller 604 performs control associated with transmission and reception, such as assembly and dissolution of a transmission/reception frame, addition and detection of a preamble, and identification of a frame. The transmission/reception controller 604 controls the NFC tag chip memory 605 and reads and writes various data and various programs. When operating in the active mode, the NFC unit 306 receives power supply from the power supply unit 606 and communicates with the main board 310 through the device connection unit 607. In this case, the NFC unit 306 communicates with an external device installed in a communication available range by carriers transmitted and received through the antenna unit 602. When operating in the passive mode, the NFC unit 306 receives carriers from the external device through an antenna, receives power supply from the external device by electromagnetic induction, and communicates with other NFC devices by carrier modulation so as to transmit and receive data.

Note that, in this specification, an operation of moving the NFC reader/writer unit 201 of the mobile terminal apparatus 200 and the NFC unit 306 of the MFP 300 close to each other is referred to as an "NFC touch operation".

Figure 7:
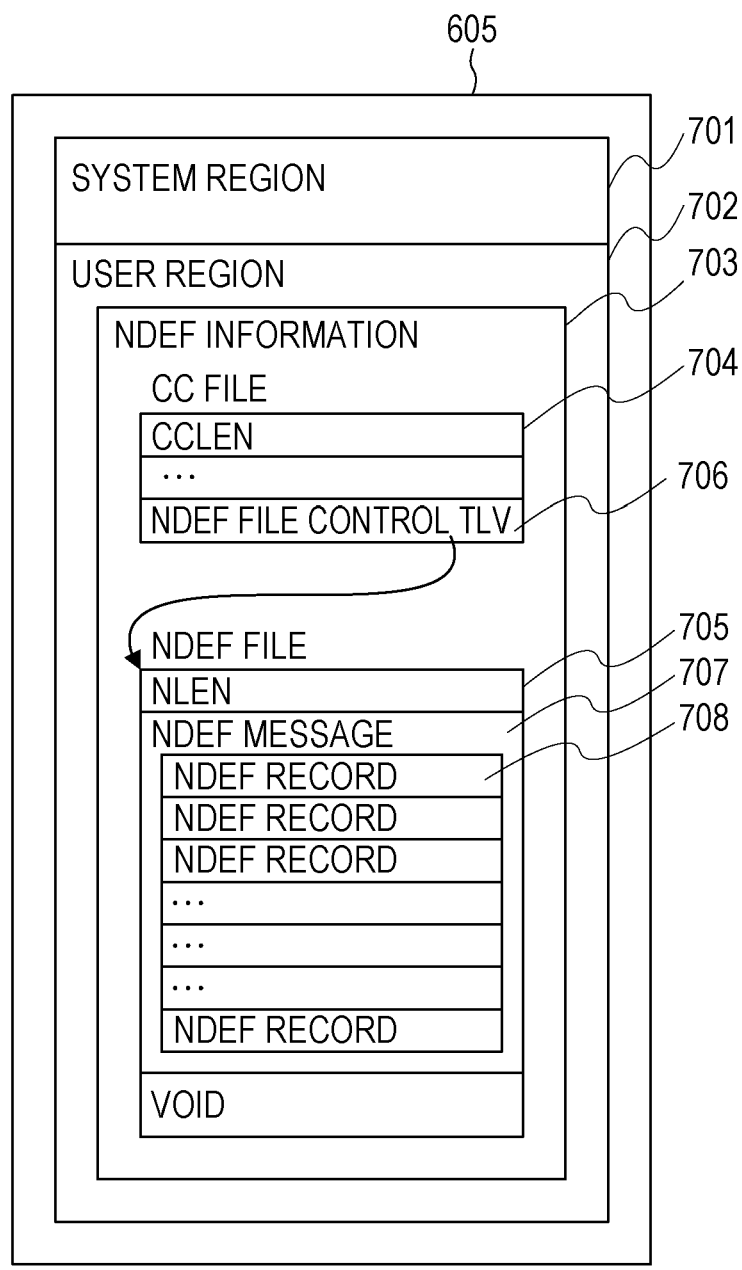
FIG. 7 is a diagram illustrating content of an NFC tag chip memory included in the MFP.

FIG. 7 is a diagram illustrating content of the NFC tag chip memory 605 included in the MFP 300.

The NFC tag chip memory 605 stores various information and roughly has a system region 701 which defines an operation as an NFC tag and a user region 702 which stores information on use cases to be employed and information on applications. The user region 702 stores data 703 in an NFC data exchange format which is referred to as the "NDEF". The NDEF information 703 includes two types of information, that is, a CC file 704 and an NDEF file 705. A plurality of CC files 704 and a plurality of NDEF files 705 may be included depending on a configuration. For simplicity, a case where one CC file 704 and one NDEF file 705 are included in the NDEF information 703 is described in this embodiment.

The CC file 704 includes NDEF file control TLV 706 which is management information associated with the NDEF file 705, and the NDEF file 705 is accessible using the NDEF file control TLV 706. The NDEF file 705 includes an NDEF message 707 including a plurality of NDEF records 708. Each of the NDEF records 708 includes a record type, an ID, and record data, and desired information is retrieved by specifying the record type or the ID so that reading and writing is performed. The description above is merely an example of content of the NFC tag chip memory 605, and memory mapping and a management method other than those in the description above may be used.

FIGS. 8A to 8D are diagrams illustrating content of the NDEF message 707 according to this embodiment.

Figure 8A:
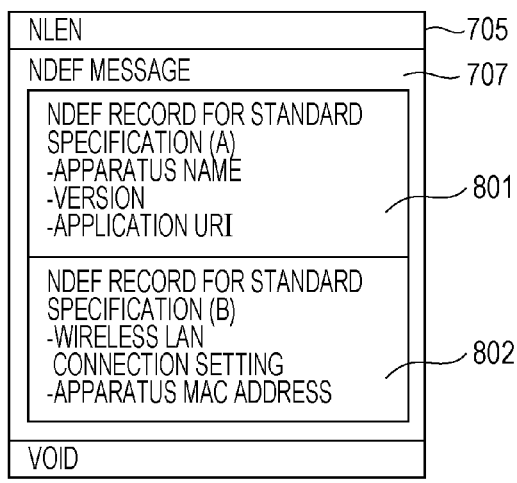
FIGS. 8A to 8D are diagrams illustrating content of an NDEF message according to this embodiment.

FIG. 8A is a diagram illustrating content of the NDEF message 707 in an initial state written in the NFC tag chip memory 605 of the MFP 300. The NDEF message 707 includes an NDEF record 801 for a standard specification (A) and an NDEF record 802 for a standard specification (B) which are not limited to a specific manufacturer and a specific application. The NDEF message 707 is written in the NFC tag chip memory 605 when the MFP 300 is shipped or the MFP 300 is powered under control of the CPU 311 of the MFP 300. Alternatively, the NDEF message 707 is written in the NFC tag chip memory 605 through a sequence described in a flowchart described below. Although content of the standard specification (A) is not specifically limited here, the NDEF record 801 in FIG. 8A includes information on an application URI in addition to information on an apparatus name and information on a version, for example. By this, when the NFC touch is performed by the mobile terminal apparatus 200 on the MFP 300, the mobile terminal apparatus 200 may realize download of an application for use of the MFP 300 from an address indicated by the application URI, for example.

Furthermore, although content of the standard specification (B) is also not specifically limited here, the NDEF record 802 in FIG. 8A includes information on a wireless LAN connection setting and information on an apparatus MAC address, for example. The mobile terminal apparatus 200 obtains the information on the wireless LAN connection setting and the information on the apparatus MAC address from the MFP 300 by performing the NFC touch on the MFP 300 so as to establish wireless LAN connection to the MFP 300.

Figure 8B:
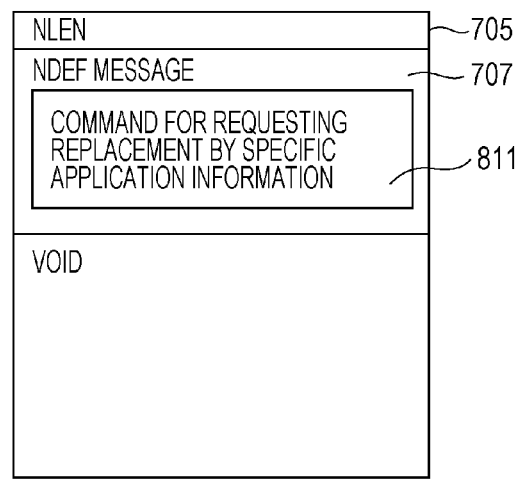

FIG. 8B is a diagram illustrating content of the NDEF message 707 written by the mobile terminal apparatus 200 to the NFC tag chip memory 605 as an information replacement request.

The NDEF message 707 includes a command, as an NDEF record 811, for requesting replacement of content of the NFC tag chip memory 605 of the MFP 300 by specific application information. A timing when the NDEF message 707 is written in the NFC tag chip memory 605 will be described in detail with reference to a flowchart below.

Figure 8C:
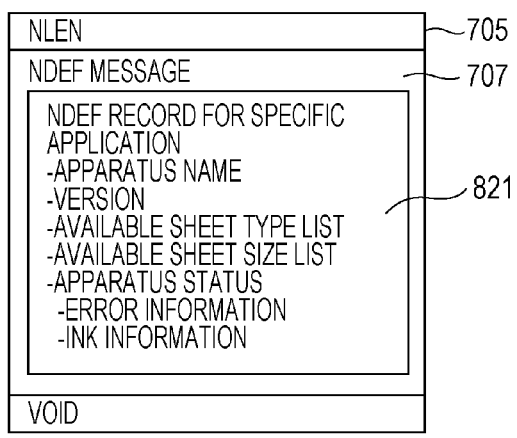

FIG. 8C is a diagram illustrating content of the NDEF message 707 written by the MFP 300 when it is detected that the NDEF message 707 of FIG. 8B is written by the mobile terminal apparatus 200. The NDEF message 707 includes information to be used by a specific application as an NDEF record 821. The NDEF record 821 is referred to as "data for a specific application in the NDEF" where appropriate.

Here, as the "specific application" described above, an application which causes the MFP 300 to execute a print process is estimated. The NDEF record 821 includes a list of sheet types available for the MFP 300, a list of sheet sizes available for the MFP 300, and apparatus status information, such as error information and information on an ink remaining amount. A timing when the NDEF information is written in the NFC tag chip memory 605 will be described in detail with reference to a flowchart below.

The specific application sets a sheet type and a sheet size for a print process in accordance with information obtained when the NFC touch between the mobile terminal apparatus 200 and the MFP 300 is performed and issues a print job to the MFP 300.

Figure 8D:
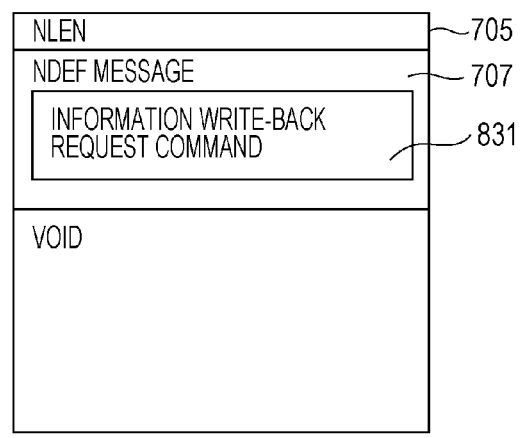

FIG. 8D is a diagram illustrating content of the NDEF message 707 written by the mobile terminal apparatus 200 in the NFC tag chip memory 605 as an information write-back request. The NDEF message 707 includes a command, as an NDEF record 831, for requesting write-back of the original NDEF message 707, that is, the NDEF message illustrated in FIG. 8A, to the NFC tag chip memory 605 of the MFP 300. A timing when the NDEF information is written in the NFC tag chip memory 605 will be described in detail with reference to the flowchart below.

Figure 9A:
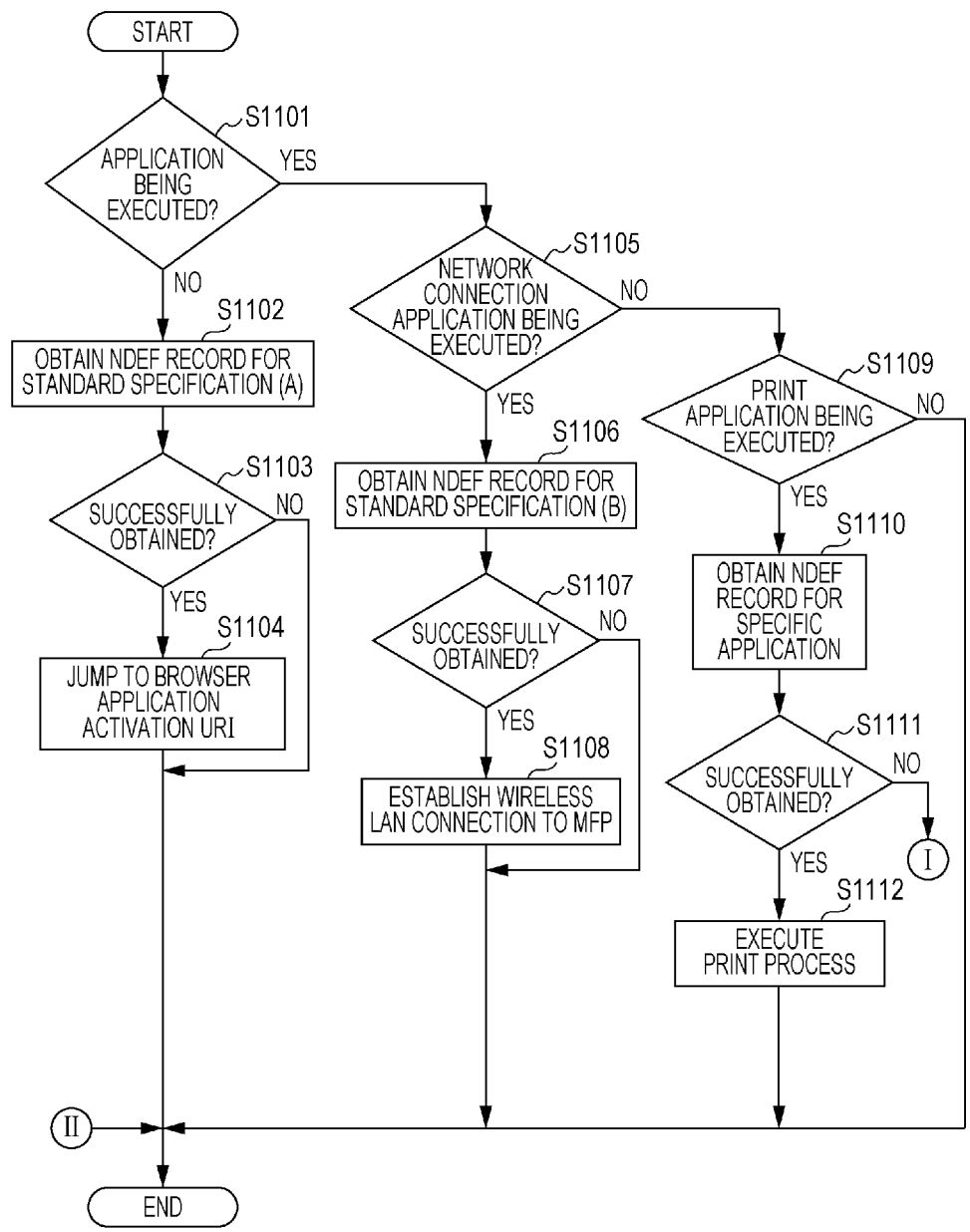
FIGS. 9A and 9B are a flowchart illustrating a process performed by a CPU included in the mobile terminal apparatus.
Figure 9B:
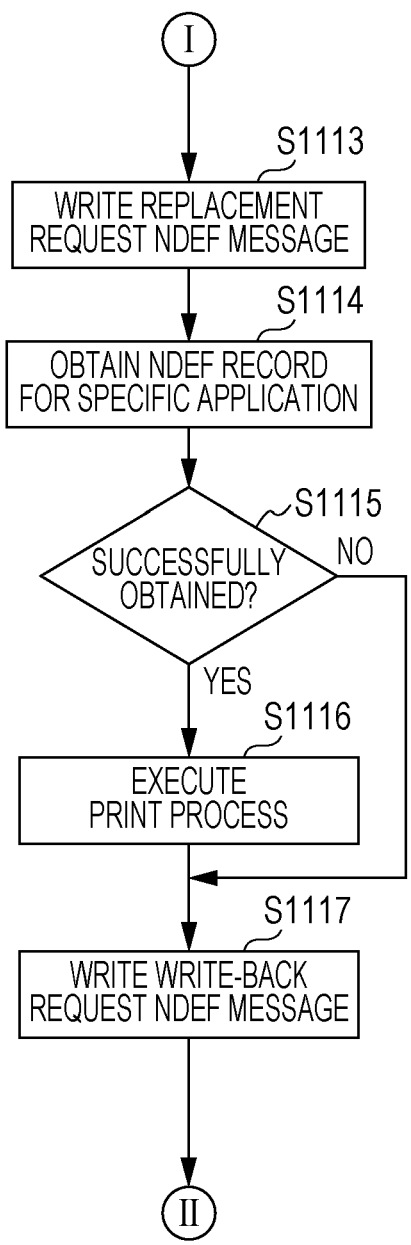

FIGS. 9A and 9B are a flowchart illustrating a process performed by the CPU 211 included in the mobile terminal apparatus 200 according to this embodiment.

This process is stored in the program memory 213 or the nonvolatile memory 221 of the mobile terminal apparatus 200 and is executed by the CPU 211 of the mobile terminal apparatus 200 when the NFC touch operation between the mobile terminal apparatus 200 and the MFP 300 is detected.

First, in step S1101, the mobile terminal apparatus 200 determines whether an application is being executed. When an application is not being executed (No in step S1101) the CPU 211 performs NFC communication with the NFC unit 306 of the MFP 300 in step S1102 so as to obtain the NDEF message 707 from the NFC tag chip memory 605. Thereafter, the CPU 211 determines whether the NDEF record 801 for the standard specification (A) has been obtained by searching the NDEF message 707 for the NDEF record 801 for the standard specification (A) (step S1103). When successfully obtaining the NDEF record 801 for the standard specification (A) (Yes in step S1103), the CPU 211 executes an operation in accordance with the standard specification (A) in step S1104. For example, the CPU 211 activates a standard browser application and jumps to an address indicated by an URI included in the NDEF record 801 for the standard specification (A).

On the other hand, when it is determined that an application is being executed (Yes in step S1101), a process is performed in step S1105 or step S1109 depending on the application being executed. When a network connection application based on the standard specification (B) is being executed (Yes in step S1105), the CPU 211 obtains the NDEF record 802 for the standard specification (B) in step S1106. When the NDEF record 802 for the standard specification (B) is successfully obtained (Yes in step S1107), the CPU 211 executes an operation in accordance with the standard specification (B) in step S1108. For example, the CPU 211 changes a wireless LAN setting of the mobile terminal apparatus 200 using the wireless LAN connection setting included in the NDEF record 801 for the standard specification (B) and executes an operation of establishing the wireless LAN communication with the MFP 300 in accordance with an apparatus MAC address.

On the other hand, when it is determined that a specific print application which uses the MFP 300 is being executed in step S1109, the CPU 211 obtains the NDEF record 821 for the specific print application in step S1110. Here, when the NDEF record 821 for the specific application is successfully obtained (Yes in step S1111), the CPU 211 generates a print job utilizing information included in the NDEF record 821 for the specific application in step S1112. Then the CPU 211 executes a print process by transmitting the print job to the MFP 300. The information included in the NDEF record 821 for the specific application corresponds to information included in an NDEF record for a nonstandard specification application, for example.

However, if the NDEF record 821 for the specific application is not included in the NDEF message 707 in the initial state as illustrated in FIG. 8A described above, it is determined that obtainment of the NDEF record 821 has failed in step S1111 (No in step S1111). In this case, the CPU 211 writes the NDEF record 811 including the command for requesting replacement by specific application information in the NFC tag chip memory 605 in step S1113 as illustrated in FIG. 8B.

In step S1114, the CPU 211 obtains the NDEF record 821 for the specific application again. When successfully obtaining the NDEF record 821 for the specific application (Yes in step S1115), the CPU 211 generates a print job utilizing the information included in the NDEF record 821 for the specific application in step S1116. Thereafter, the CPU 211 transmits the print job to the MFP 300 so that a print process is executed. The CPU 211 writes the NDEF record 831 including the information write-back request command in the NFC tag chip memory 605 in step S1117 as illustrated in FIG. 8D so as to restore the content of the NFC tag chip memory 605 to the original state. Note that the writing of the information write-back request command may be executed immediately after the NDEF record 821 is obtained in step S1114.

In the description above, the CPU 211 determines whether the NDEF record 821 for the specific application is included in the NDEF message 707 in the initial state in step S1110 and step S1111, and thereafter, performs control so that the replacement request is written in step S1113. However, if it is determined that the NDEF record 821 for the specific application is not included in the NDEF message 707 in the initial state in advance, the operation in step S1113 may be executed without performing the process in step S1110 and step S1111. Moreover, in the description above, the mobile terminal apparatus 200 clearly notifies the MFP 300 of a write-back timing by writing the NDEF record 831 including the information write-back request command in the NFC tag chip memory 605. However, the write-back may be executed in response to an interrupt signal or the like generated when the NFC unit 306 detects a read operation through the NFC communication with an external device. In addition, although the process from step S1109 to step S1117 in FIG. 9A is executed by the CPU 211 in the foregoing description, the process may be executed by the specific application.

Figure 10:
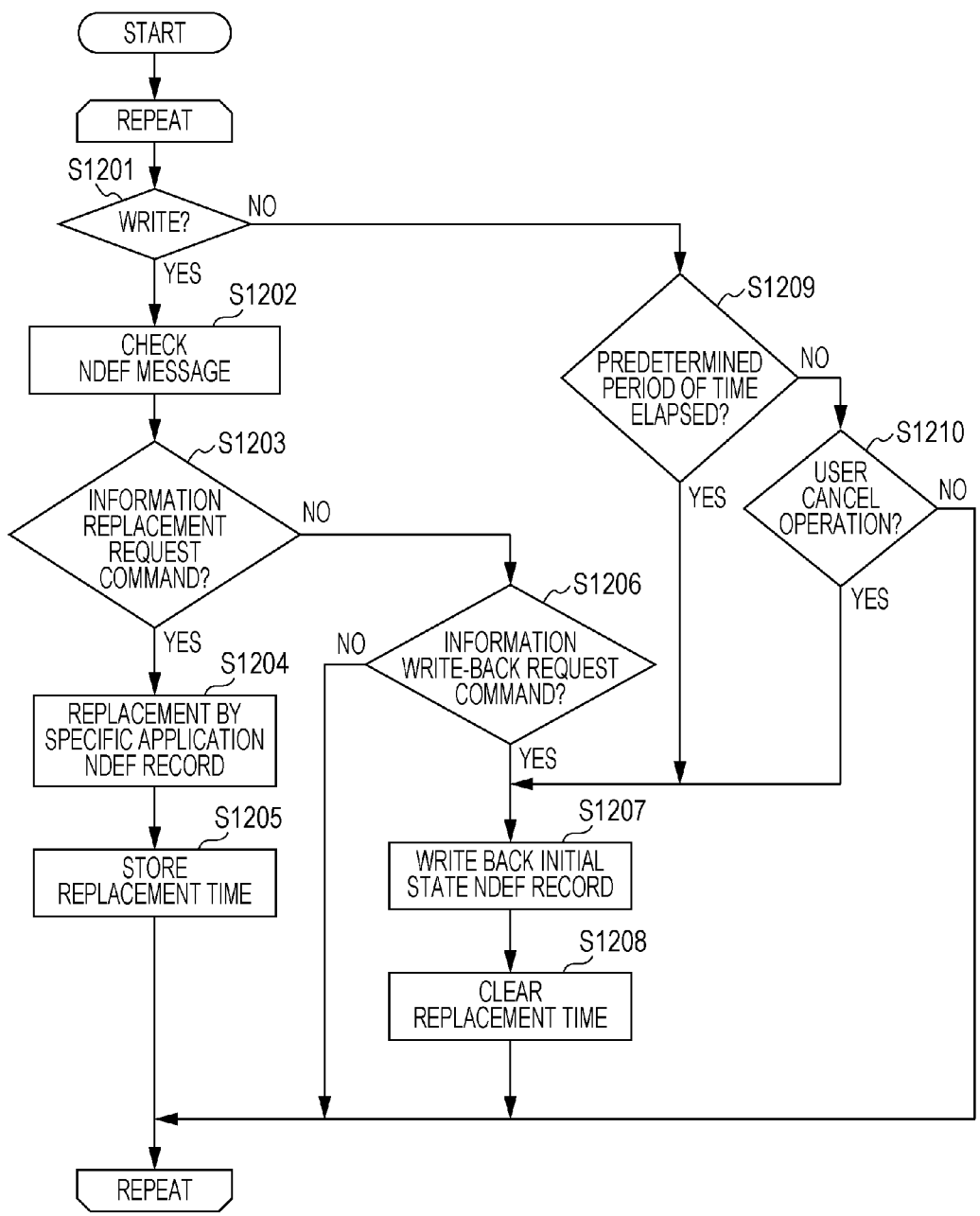
FIG. 10 is a flowchart illustrating a process performed by a CPU included in the MFP.

FIG. 10 is a flowchart illustrating a process performed by the CPU 311 included in the MFP 300 according to this embodiment.

This process is stored in the program memory 313 of the MFP 300 and is repeatedly executed when the MFP 300 is in a power-on state. In a repetitive loop, it is determined whether a write operation has been performed by the external device on the NFC tag chip memory 605 in step S1201. The NFC unit 306 detects a write operation through the NFC communication with the external device and the CPU 311 determines whether the write operation has been performed using a generated interrupt signal or the like. Alternatively, the CPU 311 may periodically monitor the content of the NFC tag chip memory 605 and detect a write operation when the content of the NFC tag chip memory 605 is changed. When the write operation is detected (Yes in step S1201), the CPU 311 checks content of the NDEF message 707 written by the external device in step S1202.

In step S1203, when the NDEF record 811 for the information replacement command is written in the NDEF message 707, the CPU 311 writes the NDEF record 821 for the specific application in the NFC tag chip memory 605 in step S1204. Note that the NDEF record 821 for the specific application is read from the program memory 313 and written in the NFC tag chip memory 605. Then the CPU 311 stores a current time point as a time point when the content of the NFC tag chip memory 605 is replaced in step S1205.

On the other hand, when it is determined that the NDEF record 831 of the information write-back request command is written in the NDEF message 707 in step S1206, the CPU 311 writes back the NDEF record in the initial state in the NFC tag chip memory 605 in step S1207. Specifically, the CPU 311 writes back the NDEF message 707 including the NDEF record 801 for the standard specification (A) and the NDEF record 802 for the standard specification (B) (refer to FIG. 8A) in the NFC tag chip memory 605. Since the replacement time point stored in step S1205 becomes useless, the CPU 311 clears the replacement time point in step S1208.

When the write operation is not performed in step S1201, the CPU 311 determines whether a predetermined period of time has been elapsed after the stored replacement time point in step S1209. When the predetermined period of time has been elapsed, the CPU 311 determines that time-out is reached and writes back the NDEF record in the initial state in step S1207. When a cancel operation is performed using the operation panel 305 of the MFP 300 before the predetermined period of time is elapsed (Yes in step S1210), the CPU 311 writes back the NDEF record in the initial state in step S1207. By this, in a case where the operation of the specific application is stopped or the NFC communication may not be performed between the mobile terminal apparatus 200 and the MFP 300 after the replacement by the NDEF record is performed, the original information is written back.

FIG. 11 is a sequence diagram of information obtainment according to this embodiment.

In FIG. 11, an operation of requesting replacement of information in an initial state by information on the specific application, obtaining the NDEF record for the specific application, and finally writing back the NDEF message in the initial state is illustrated.

In step S1301, the NFC communication is performed between the mobile terminal apparatus 200 and the NFC unit 306 of the MFP 300 and the mobile terminal apparatus 200 issues an NFC read request for reading content of the NFC tag chip memory 605. In step S1302, information on the NDEF records 801 and 802 included in the NDEF message in the initial state is returned as a response. Since the NDEF record 821 for a desired specific application is not included, the mobile terminal apparatus 200 is required to write a command for requesting replacement by specific application information in the NFC tag chip memory 605.

In step S1303, the mobile terminal apparatus 200 issues an NFC write request for writing data on the NDEF record 811 in the NFC tag chip memory 605. A response to the NFC write request is transmitted in step S1304, and an NFC write interrupt is generated from the NFC unit 306 of the MFP 300 to the CPU 311 in step S1305. In response to the NFC write interrupt, the CPU 311 of the MFP 300 reads content of the NFC tag chip memory 605 so as to check content of the NDEF message in step S1306. Here, the NDEF record 811 which is the command for replacement by specific application information has been written in the NDEF message. Accordingly, the CPU 311 writes the NDEF record 821 for the specific application in the NFC tag chip memory 605 in step S1307.

After the operation in step S1307, when an NFC read request is issued by the mobile terminal apparatus 200 in step S1308, information on the NDEF record 821 written in step S1307 is returned as a response to the NFC read request in step S1309. In this way, the mobile terminal apparatus 200 obtains the desired NDEF record 821. Thereafter, a sequence of restoring the content of the NFC tag chip memory 605 which has been replaced is executed. The mobile terminal apparatus 200 is required to write the information write-back request command in the NFC tag chip memory 605.

In step S1310, the mobile terminal apparatus 200 issues an NFC write request for writing data on the NDEF record 831 in the NFC tag chip memory 605. A response to the NFC write request is transmitted in step S1311, and an NFC write interrupt is issued from the NFC unit 306 of the MFP 300 to the CPU 311 in step S1312.

In response to the NFC write interrupt, the CPU 311 of the MFP 300 reads content of the NFC tag chip memory 605 so as to check content of an NDEF message in step S1313. Here, the NDEF record 831 which is the information write-back request command has been written in the NDEF message. Accordingly, the CPU 311 writes the NDEF records 801 and 802 in the NFC tag chip memory 605 as the NDEF message in the initial state in step S1314.

In this way, even when the NDEF record 821 for the specific application is not included in the NDEF message 707 in the initial state, the CPU 311 writes the NDEF record 821 for the specific application where appropriate. By this process, even in a case where all the NDEF record 801 for the standard specification (A), the NDEF record 802 for the standard specification (B), and the NDEF for the specific application are not allowed to be stored owing to limitation of the capacity of the NFC tag chip memory 605, appropriate information may be supplied to the mobile terminal apparatus 200. Accordingly, even in a case where all the NDEF record 801 for the standard specification (A), the NDEF record 802 for the standard specification (B), and the NDEF record 821 for the specific application are not allowed to be accommodated in the capacity of the NFC tag chip memory 605, the three specifications may be accepted.

Second Embodiment

FIGS. 12A to 12F are diagrams illustrating content of an NDEF message 707 according to a second embodiment.

Figure 12A:
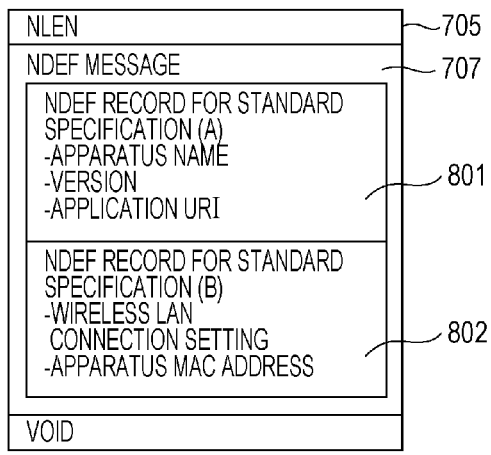
FIGS. 12A to 12F are diagrams illustrating content of an NDEF message according to a second embodiment.

FIG. 12A is a diagram illustrating content of the NDEF message 707 in an initial state written in an NFC tag chip memory 605 of an MFP 300. The content of the NDEF message 707 and a timing when the NDEF message 707 is written are the same as those illustrated in FIG. 8A.

Figure 12B:
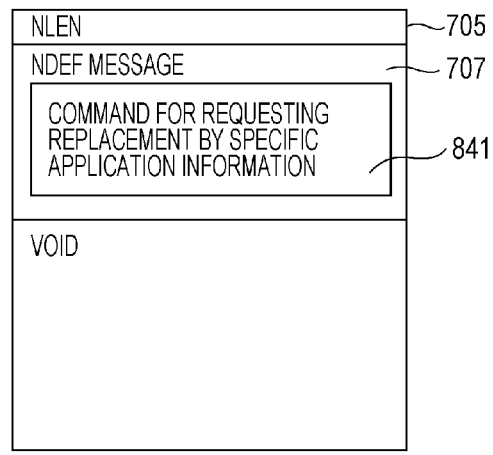

FIG. 12B is a diagram illustrating content of the NDEF message 707 written by a mobile terminal apparatus 200 to the NFC tag chip memory 605 as information replacement request while a print application is being operated.

The NDEF message 707 includes a command, as an NDEF record 841, for requesting replacement of content of the NFC tag chip memory 605 of the MFP 300 by information required for the print application. The timing when the NDEF message 707 is written in the NFC tag chip memory 605 will be described in detail with reference to a flowchart below.

Figure 12C:
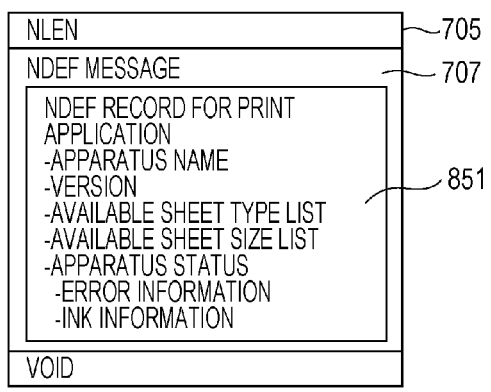

FIG. 12C is a diagram illustrating content of the NDEF message 707 written by the MFP 300 when it is detected that the NDEF message 707 of FIG. 12B is written by the mobile terminal apparatus 200. The NDEF message 707 includes information to be used by the print application as an NDEF record 851. The NDEF record 851 includes a list of sheet types available for the MFP 300, a list of sheet sizes available for the MFP 300, and apparatus status information, such as error information and information on an ink remaining amount. A timing when the NDEF information is written in the NFC tag chip memory 605 will be described in detail with reference to the flowchart below.

Figure 12D:
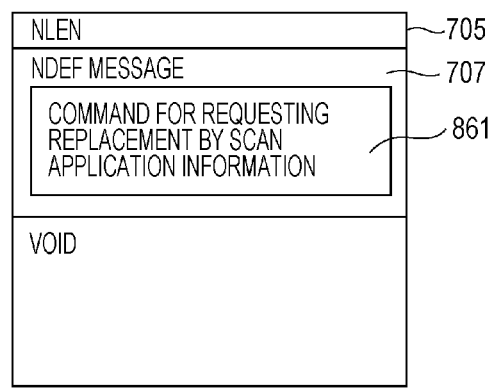

FIG. 12D is a diagram illustrating content of the NDEF message 707 written in the NFC tag chip memory 605 as an information replacement request while a scan application is operated in the mobile terminal apparatus 200. The NDEF message 707 includes a command, as an NDEF record 861, for requesting replacement of content of the NFC tag chip memory 605 of the MFP 300 by information required for the scan application. A timing when the NDEF message 707 is written in the NFC tag chip memory 605 will be described in detail with reference to the flowchart below.

Figure 12E:
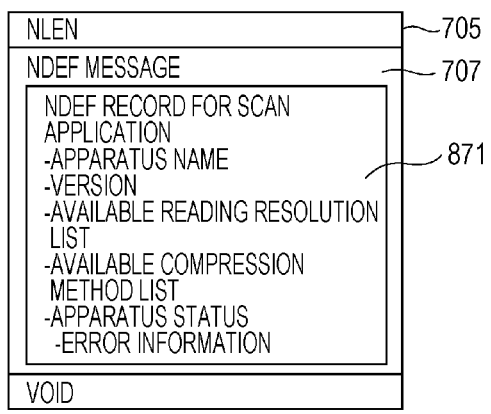

FIG. 12E is a diagram illustrating content of the NDEF message 707 written by the MFP 300 when it is detected that the NDEF message 707 of FIG. 12D is written by the mobile terminal apparatus 200. The NDEF message 707 includes information to be used by the scan application as an NDEF record 871. The NDEF record 871 includes a list of reading resolutions available for the MFP 300, a list of compression methods available for the MFP 300, and apparatus status information, such as error information. A timing when the NDEF information is written in the NFC tag chip memory 605 will be described in detail with reference to the flowchart below.

Figure 12F:
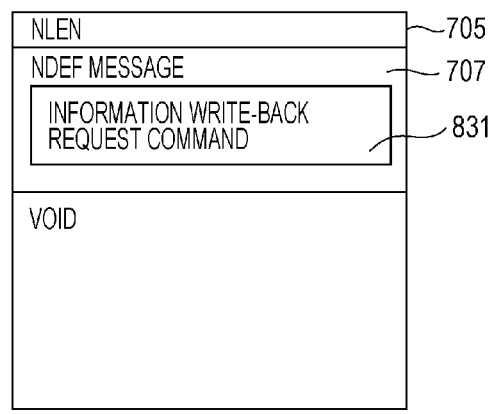

FIG. 12F is a diagram illustrating content of the NDEF message 707 written by the mobile terminal apparatus 200 in the NFC tag chip memory 605 as an information write-back request. The content of the NDEF message 707 and a timing when the NDEF message 707 is written are the same as those illustrated in FIG. 8D.

Figure 13B:
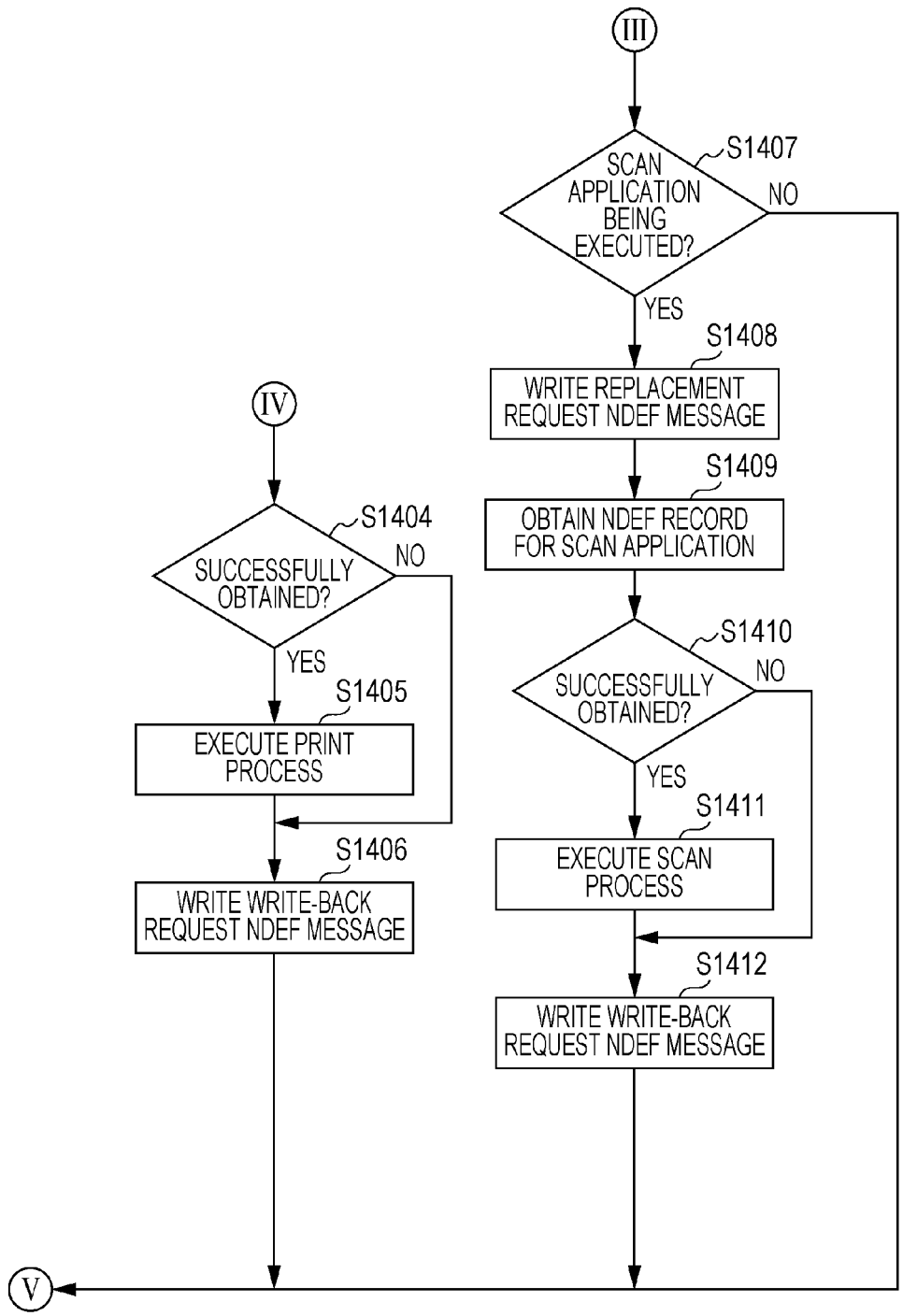

FIGS. 13A and 13B are a flowchart illustrating a process performed by a CPU 211 included in the mobile terminal apparatus 200 of this embodiment.

This process is stored in a program memory 213 or a nonvolatile memory 221 of the mobile terminal apparatus 200 and is executed by the CPU 211 of the mobile terminal apparatus 200 when an NFC touch operation between the mobile terminal apparatus 200 and the MFP 300 is detected. A process from step S1101 to step S1108 is the same as that from step S1101 to step S1108 in FIG. 9A according to the first embodiment, and therefore, a description thereof is omitted. In step S1401, when the CPU 211 determines that the print application for the MFP 300 is being executed, the process in FIG. 13A proceeds to step S1402.

Thereafter, the CPU 211 writes the NDEF record 841 including the command for requesting replacement by print application information in the NFC tag chip memory 605 in step S1402 as illustrated in FIG. 12B. In step S1403, the CPU 211 obtains the NDEF record 851 for the print application. When the CPU 211 determines that the NDEF record 851 for the print application has been received in step S1404, the process proceeds to step S1405. The CPU 211 generates a print job using information included in the NDEF record 851 for the print application and transmits the print job to the MFP 300 which executes a print process. The CPU 211 writes the NDEF record 831 including the information write-back request command in the NFC tag chip memory 605 in step S1406 as illustrated in FIG. 12F so as to restore the content of the NFC tag chip memory 605.

On the other hand, when the determination is negative in step S1401, the CPU 211 determines whether the scan application for the MFP 300 is being executed in step S1407. When the scan application is being executed, the process proceeds to step S1408. Then the CPU 211 writes the NDEF record 861 including the command for requesting replacement by scan application information in the NFC tag chip memory 605 as illustrated in FIG. 12D. In step S1409, the CPU 211 obtains the NDEF record 871 for the scan application. When the CPU 211 determines that the NDEF record 871 for the scan application has been received in step S1410, the process proceeds to step S1411. Thereafter, the CPU 211 generates a scan job using information included in the NDEF record 871 for the scan application and transmits the scan job to the MFP 300 which executes a scan process. The CPU 211 writes the NDEF record 831 including the information write-back request command in the NFC tag chip memory 605 in step S1412 as illustrated in FIG. 12F so as to restore the content of the NFC tag chip memory 605.

Note that the NDEF record 841 including the command for requesting replacement by the print application information in step S1402 of the second embodiment corresponds to the NDEF record 811 for the specific application of the first embodiment. Note that the NDEF record 861 including the command for requesting replacement by the scan application information in step S1408 of the second embodiment corresponds to the NDEF record 811 for the specific application of the first embodiment.

Figure 14A:
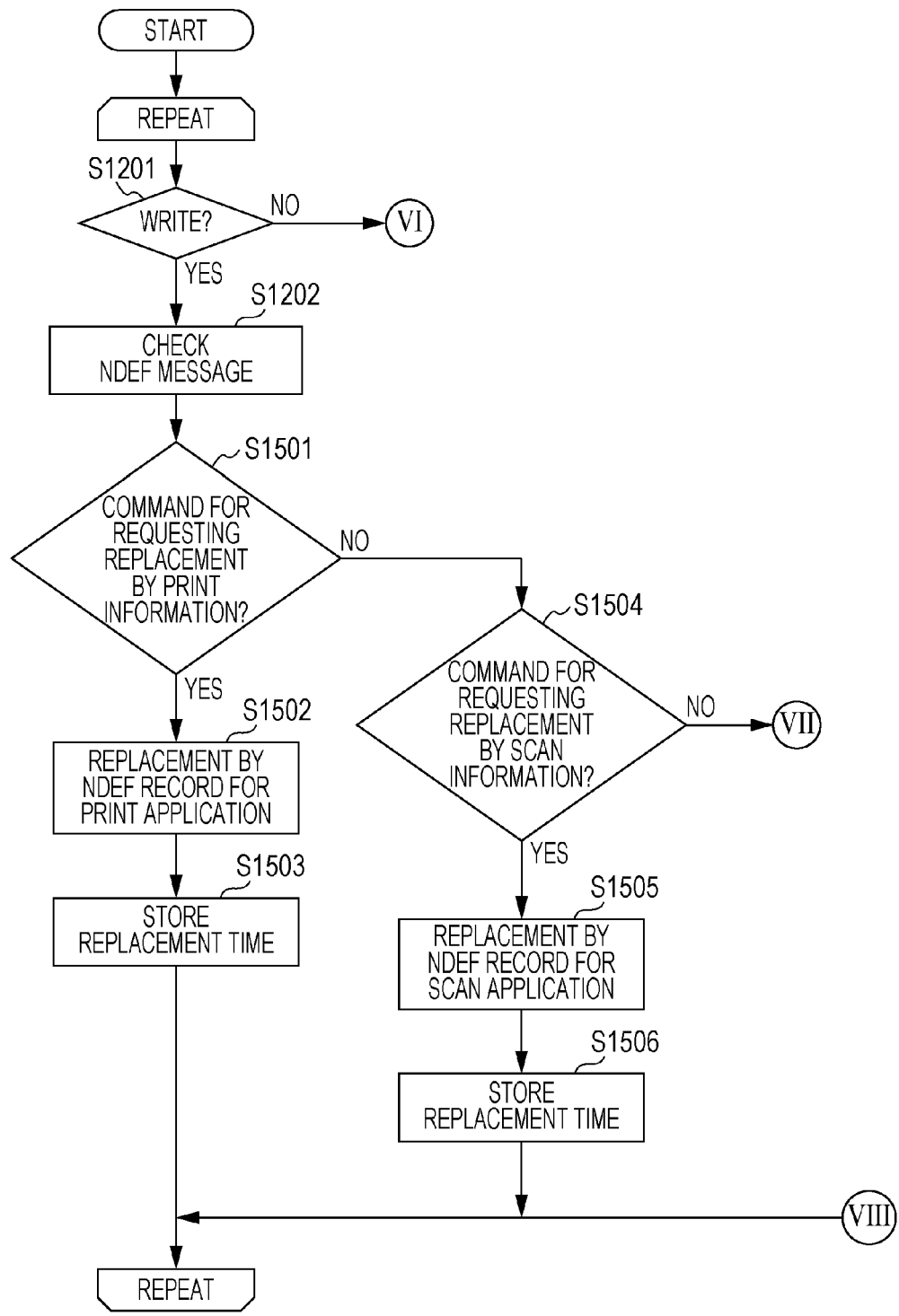
FIGS. 14A and 14B are a flowchart illustrating a process performed by a CPU included in an MFP.
Figure 14B:
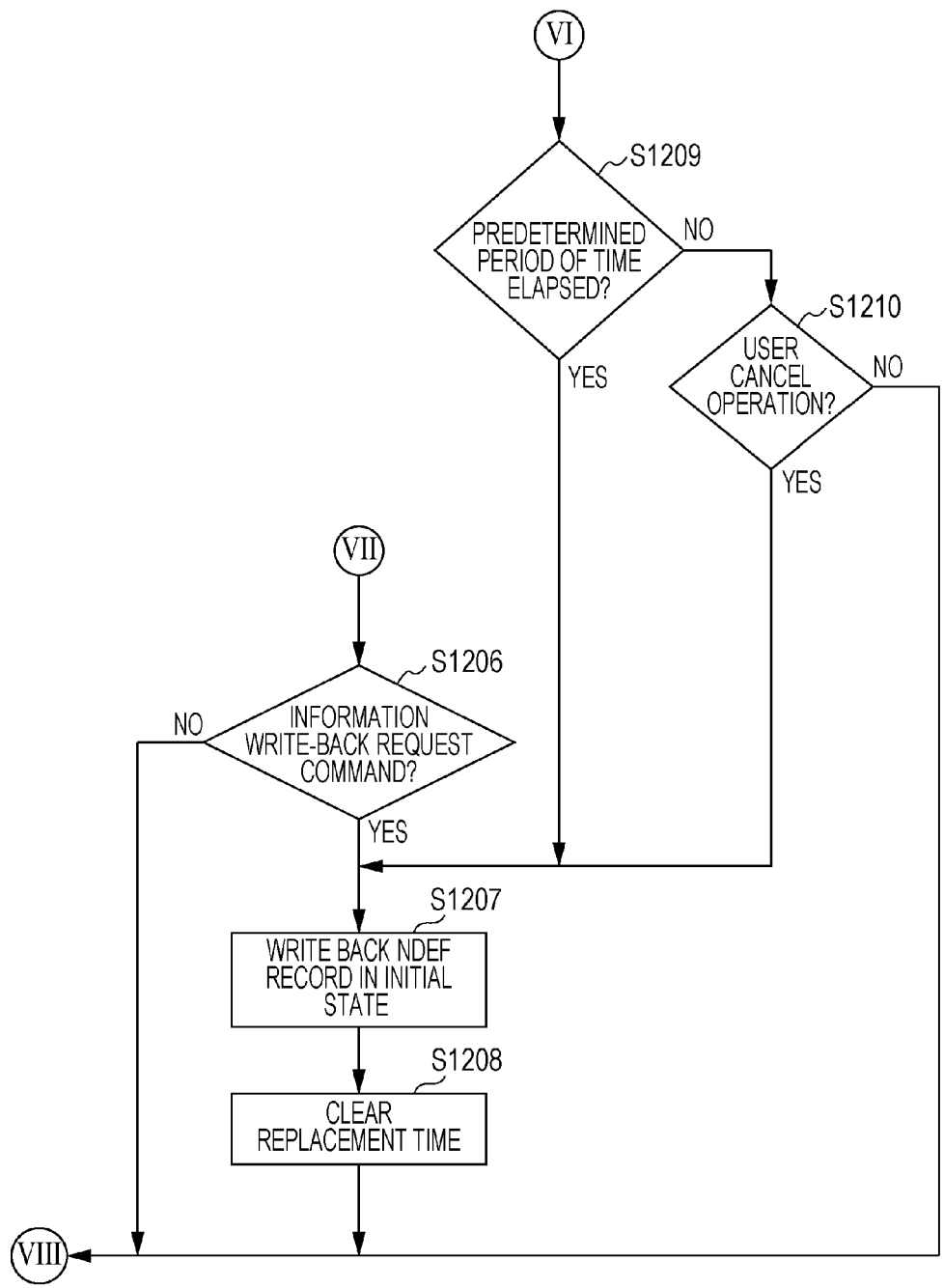

FIGS. 14A and 14B are a flowchart illustrating a process performed by the CPU 311 included in the MFP 300 according to this embodiment.

This process is stored in a program memory 313 of the MFP 300 and is repeatedly executed when the MFP 300 is in a power-on state. A process from step S1201 to step S1202 and a process from step S1206 to step S1210 are the same as that from step S1201 to step S1202 and that from step S1206 to step S1210 in FIG. 10 according to the first embodiment, respectively, and therefore, descriptions thereof are omitted.

In step S1201 and step S1202, after a write operation onto the NFC tag chip memory 605 is detected, a process corresponding to content of the NDEF record written as the NDEF message 707 is performed. The CPU 311 determines whether the NDEF record 841 of the command for replacement by the print application information has been written in the NDEF message 707 in step S1501. When it is determined that the NDEF record 841 of the command for replacement by the print application information has been written in the NDEF message 707 (Yes in step S1501), the process proceeds to step S1502. Then the CPU 311 writes the NDEF record 851 for the print application in the NFC tag chip memory 605 in step S1502, and stores a current time point as a time point when the content of the NFC tag chip memory 605 is replaced in step S1503. Furthermore, when the determination is negative in step S1501, the CPU 311 determines whether the NDEF record 861 of the command for replacement by the scan application information has been written in the NDEF message 707 in step S1504. When the determination is affirmative in step S1504, the CPU 311 writes the NDEF record 871 for the scan application in the NFC tag chip memory 605 in step S1505. Then the CPU 311 stores a current time point as a time point when the content of the NFC tag chip memory 605 is replaced in step S1506.

As described above, content of an NDEF record to be obtained may be selectively changed by changing content of the information replacement request command when different applications for different usages, such as the print application and the scan application, are being operated. By this, even though the capacity of the NFC tag chip memory 605 is limited, a larger number of specifications may be accepted.

Other Embodiments

As described in the foregoing embodiments, the NDEF record 821 for the specific application is written in the NFC tag chip memory 605 from the program memory 313, for example, in response to a replacement request supplied from the mobile terminal apparatus 200. Meanwhile, the NDEF record 801 for the standard specification (A) and the NDEF record 802 for the standard specification (B) according to the foregoing embodiments are required to be directly read from an external device by a single NFC read operation.

Therefore, the content of the NFC tag chip memory 605 which has been replaced by the NDEF record 821 for the specific application is preferably replaced by the NDEF record 801 for the standard specification and the NDEF record 802 for the standard specification (B) immediately after a required process is performed. The same replacement is performed on the NDEF records 811 and 831 written by the external device in response to the replacement request and the write-back request, respectively. However, in a case where the NDEF records 811 and 831 which are the replacement request and the write-back request, respectively, are written in the NFC tag chip memory 605 from the external device in a power off state of the MFP 300, the CPU 311 is not activated. Therefore, the content of the NFC tag chip memory 605 may not be replaced by the NDEF record 821 for the specific application, and the NDEF record 801 for the standard specification (A) and the NDEF record 802 for the standard specification (B) may not be written back in the NFC tag chip memory 605.

To address this problem, in the power off state of the MFP 300, the NFC communication with external devices may be prohibited. Specifically, electronic apparatuses including the MFP 300 may not allow the mobile terminal apparatus 200 to perform writing to the NFC tag chip memory 605 in the power off state of the MFP 300. Furthermore, the NFC unit 306 may be configured such that the NFC unit 306 does not allow external devices to perform writing in the NFC tag chip memory 605 in the power off state of the MFP 300.

Furthermore, the NFC unit 306 may be configured such that the NDEF records 801 and 802 in the initial states are reliably written back in a power on state of the MFP 300. That is, it is preferable that the electronic apparatuses including the MFP 300 write the NDEF record 801 for the standard specification (A) or the NDEF record 802 for the standard specification (B) in the NFC tag chip memory 605 when the power is on.

Although the mobile terminal apparatus 200 and the MFP 300 communicate with each other in the foregoing embodiments, other electronic apparatuses may be used instead of the MFP 300. That is, the mobile terminal apparatus 200 and an electronic apparatus may communicate with each other.

Furthermore, although the NFC is used as an example of near-field communication in this application, other communication methods (such as Bluetooth Low Energy) may be used. Moreover, although an NFC tag chip memory is employed in this application, other tag chips may be employed. Although the format of the data stored in the tag chip is NDEF in this application, other formats may be employed.

Although the communication between a mobile terminal apparatus and an MFP is described in this application, this application is applicable to other combinations of apparatuses, such as a combination of a mobile terminal apparatus and a digital still camera and a combination of a mobile terminal apparatus and a data storage apparatus.

According to the present disclosure, a larger number of standard specifications based on the NDEF and specifications unique to electronic apparatus manufacturers may be accepted without increasing a capacity of a tag chip of an NFC unit. Accordingly, a larger number of specifications may be accepted without increasing manufacturing cost of an electronic apparatus, and consequently, usability of the electronic apparatus may be improved.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosed exemplary embodiments are not seen to be limiting. The scope of the following claims is to be accorded the broadest interpretation so as to encompass all such modifications and equivalent structures and functions.

This application claims the benefit of Japanese Patent Application No. 2014-159369, filed Aug. 5, 2014, which is hereby incorporated by reference herein in its entirety.

What is claimed is:

1. A system where communication is performed using near-field communication, the system comprising:
a mobile terminal apparatus; and
an electronic apparatus including a near-field communication tag chip,
the mobile terminal apparatus including:
a read unit configured to read first information from the tag chip, and
a first write unit configured to write, in the tag chip of the electronic apparatus, second information representing a request for replacement of information stored in the tag chip,
the electronic apparatus including:
a second write unit configured to write third information in the tag chip after the second information is written in the tag chip by the mobile terminal apparatus,
wherein the read unit reads the third information from the tag chip, and
wherein the second write unit writes back the first information in the tag chip after the third information is read from the tag chip by the mobile terminal apparatus.

2. The system according to claim 1,
wherein the first information is data of an NFC data exchange format (NDEF),
wherein the second information is a command for requesting replacement by specific application information, and
wherein the third information is data for a specific application of the NDEF.

3. The system according to claim 1,
wherein the mobile terminal apparatus further includes a determination unit configured to determine whether specific information corresponding to a specific application installed in the mobile terminal apparatus is successfully obtained, and
wherein when it is determined that the specific information is not successfully obtained, the first write unit writes the second information in the tag chip.

4. The system according to claim 1,
wherein content of the third information written in the tag chip by the electronic apparatus is changed depending on content of the second information.

5. The system according to claim 1,
wherein the electronic apparatus detects information written in the tag chip by the mobile terminal apparatus when receiving a predetermined signal.

6. The system according to claim 1,
wherein the electronic apparatus detects information written in the tag chip by the mobile terminal apparatus by detecting a change of content of the information in the tag chip.

7. The system according to claim 1,
wherein the second write unit writes back the first information in the tag chip when the electronic apparatus detects that the mobile terminal apparatus reads the third information in accordance with a predetermined signal.

8. The system according to claim 1,
wherein when the electronic apparatus detects that the mobile terminal apparatus writes fourth information for requesting information write-back in the tag chip after the mobile terminal apparatus reads the third information, the second write unit writes back the first information in the tag chip.

9. The system according to claim 1,
wherein the second write unit writes back the first information in the tag chip when a predetermined period of time has elapsed after the third information is written.

10. The system according to claim 1,
wherein the second write unit writes back the first information in the tag chip when the electronic apparatus receives a cancel operation after the third information is written.

11. A method for controlling a system including a mobile terminal apparatus and an electronic apparatus where the mobile terminal apparatus obtains information from a near-field communication tag chip installed in the electronic apparatus, the method comprising:
reading first information from the tag chip;
writing, in the tag chip, second information representing a request for replacement of information stored in the tag chip; and
writing third information in the tag chip after the second information is written in the tag chip,
wherein the third information is read from the tag chip, and
wherein the first information is written back in the tag chip after the third information is read from the tag chip by the mobile terminal apparatus.

12. An information processing apparatus that obtains information from a tag chip installed in an electronic apparatus through a near-field communication, the information processing apparatus comprising:

a read unit configured to read first information from the tag chip; and a write unit configured to write, in the tag chip, second information representing a request for replacement of information stored in the tag chip, wherein the read unit reads third information written in the tag chip after the second information is written in the tag chip, and wherein the write unit writes a request for writing back the first information in the tag chip after the third information is read from the tag chip by the information processing apparatus.

13. The information processing apparatus according to claim 12, wherein the first information is data of an NFC data exchange format (NDEF), wherein the second information is a command for requesting replacement by specific application information, and wherein the third information is data for a specific application of the NDEF.

14. The information processing apparatus according to claim 12, the information processing apparatus further comprising:

a determination unit configured to determine whether information required for the information processing apparatus is included in the first information, wherein when it is determined that the required information is not included, the write unit writes the second information in the tag chip.

15. The information processing apparatus according to claim 12, wherein content of the third information written in the tag chip by the electronic apparatus is changed depending on content of the second information.

16. A computer-readable storage medium that stores computer executable instructions for executing a method by an information processing apparatus that obtains information from a tag chip installed in an electronic apparatus through near-field communication, the method comprising:

reading first information from the tag chip;

writing, in the tag chip, second information representing a request for replacement of information stored in the tag chip; and writing third information in the tag chip after the second information is written in the tag chip, wherein the third information is read from the tag chip, and wherein the first information is written back in the tag chip after the third information is read from the tag chip.

* * * * *